United States Patent
Im

(10) Patent No.: US 7,230,793 B2
(45) Date of Patent: Jun. 12, 2007

(54) MAGNETIC RECORDING HEAD WITH ANISOTROPIC MEDIUM PLACED BETWEEN POLES

(75) Inventor: Young-Hun Im, Kyungki-do (KR)

(73) Assignee: Samsung Electronics Co., Ltd., Suwon, Kyungki-do (KR)

( * ) Notice: Subject to any disclaimer, the term of this patent is extended or adjusted under 35 U.S.C. 154(b) by 504 days.

(21) Appl. No.: 10/717,516

(22) Filed: Nov. 21, 2003

(65) Prior Publication Data
US 2004/0145828 A1 Jul. 29, 2004

(30) Foreign Application Priority Data
Jan. 28, 2003 (KR) ............... 10-2003-0005485

(51) Int. Cl.
*G11B 5/23* (2006.01)
(52) U.S. Cl. .................... 360/119; 360/120
(58) Field of Classification Search ........... 360/119, 360/120
See application file for complete search history.

(56) References Cited

U.S. PATENT DOCUMENTS

| | | | |
|---|---|---|---|
| 4,130,846 A * | 12/1978 | Best ................ | 360/120 |
| 4,646,184 A * | 2/1987 | Goto et al. ............ | 360/110 |
| 5,063,467 A * | 11/1991 | Colineau et al. ...... | 360/119 |
| 5,130,876 A * | 7/1992 | Gooch .................. | 360/115 |
| 5,434,733 A * | 7/1995 | Hesterman et al. .... | 360/318.1 |
| RE35,212 E * | 4/1996 | Barnes et al. ......... | 505/171 |
| 5,926,350 A * | 7/1999 | Chiu et al. ............ | 360/121 |
| 6,760,189 B2 * | 7/2004 | Gotoh et al. .......... | 360/126 |
| 6,778,357 B2 * | 8/2004 | Tabakovic et al. .... | 360/126 |
| 6,795,272 B2 * | 9/2004 | Okada et al. ......... | 360/126 |

* cited by examiner

*Primary Examiner*—Jefferson Evans
(74) *Attorney, Agent, or Firm*—Buchanan Ingersoll & Rooney PC

(57) ABSTRACT

A magnetic recording head includes a head body having an end divided into two parts, the two parts facing each other with a predetermined distance therebetween, first and second poles that are disposed on the two parts of the head body, respectively, to form a magnetic path and that face each other with a predetermined gap therebetween, and an anisotropic medium that is interposed between the first and second poles and has a magnetic anisotropy. A magnetic field going into the predetermined gap decreases so as to be induced in the predetermined magnetic recording direction.

19 Claims, 5 Drawing Sheets

MAGNETIC RECORDING HEAD WITH ANISOTROPIC MEDIUM PLACED BETWEEN POLES

BACKGROUND OF THE INVENTION

This application claims the priority of Korean Patent Application No. 2003-5485, filed on Jan. 28, 2003, in the Korean Intellectual Property Office, the disclosure of which is incorporated herein in its entirety by reference.

FIELD OF THE INVENTION

The present invention relates to a magnetic recording head for performing magnetic recording on an information storage medium, and more particularly, to a magnetic recording head with a structure capable of maximizing a magnetic field in a recording direction.

DESCRIPTION OF THE RELATED ART

Magnetic heads are generally used to record information on and/or reproduce information from an information storage medium.

Recently, studies on magnetic recording heads using a perpendicular magnetic recording method are briskly in progress in order to increase recording density in a limited information storage field, i.e., hard disc drives (HDDs).

Unlike a general longitudinal magnetic recording head, a magnetic recording head using such a perpendicular recording method perpendicularly records a magnetization direction on a recording layer of an information storage medium. As a result, high-density recording is available, which results in a sharp increase in recording density.

FIGS. 1 and 2 show a conventional ring type magnetic recording head including a head body 1, and first and second poles 3 and 5. An end of the head body 1 is divided into two parts which face each other with a predetermined gap therebetween. The first and second poles 3 and 5 are disposed on the two parts of the head body 1, respectively, to face each other. Here, a predetermined gap $G_1$ is formed between the first and second poles 3 and 5. An insulating medium for electric insulation may be inserted into the gap $G_1$.

The conventional ring type magnetic recording head having the above-described structure records information on and/or reproduces from an information storage medium 10 including a substrate 11 and a magnetic layer 13 which is stacked on the substrate 11 and on which recording is performed in a predetermined magnetic recording direction.

Accordingly, information is recorded on the information storage medium 10 by changing a perpendicular magnetization direction due to changes in a direction of magnetic flux formed by current. The recorded information can be reproduced from the information storage medium 10 by detecting changes in resistance of a magnetoresistive device depending on the magnetization direction of the information storage medium 10.

As marked with dotted lines in FIG. 2, when the conventional ring type magnetic recording head carries out recording on the information storage medium 10, a magnetic field leaks into the predetermined gap $G_1$ between the first and second poles 3 and 5. This leakage of the magnetic field increases with a decrease in the predetermined gap $G_1$ between the first and second poles 3 and 5.

The leakage of the magnetic field greatly reduces the magnitude of a perpendicular magnetic field going toward the information storage medium 10. In addition, the leakage of the magnetic field obstructs the magnetic flux from proceeding in the recording direction.

Moreover, in a case where an isotropic magnetic medium is inserted into the predetermined gap $G_1$ of the conventional ring type magnetic recording head, the direction of magnetic flux may be induced toward the isotropic magnetic medium to considerably decrease the magnitude of the magnetic field for recording.

SUMMARY OF THE INVENTION

The present invention provides a magnetic recording head capable of securing high-density recording characteristics by reducing leakage of a magnetic field by using an anisotropic medium.

According to an aspect of the present invention, there is provided a magnetic recording head for recording information on and/or reproducing information from an information storage medium comprising a substrate and a magnetic recording layer which is stacked on the substrate and on which recording is performed in a predetermined magnetic recording direction. The magnetic recording head includes: a head body having an end divided into two parts, the two parts facing each other with a predetermined distance therebetween; first and second poles that are disposed on the two parts of the head body, respectively, to form a magnetic path and that face each other with a predetermined gap therebetween; and an anisotropic medium that is interposed between the first and second poles and has a magnetic anisotropy. A magnetic field going into the predetermined gap decreases so as to be induced in the predetermined magnetic recording direction. Here, the anisotropic medium is disposed so as to have a magnetic anisotropy in the magnetic recording direction of the magnetic recording head or in a tracking direction of the information storage medium.

The anisotropic medium is divided into two parts that face each other with a predetermined gap therebetween and includes an insulating medium that is located in the predetermined gap.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
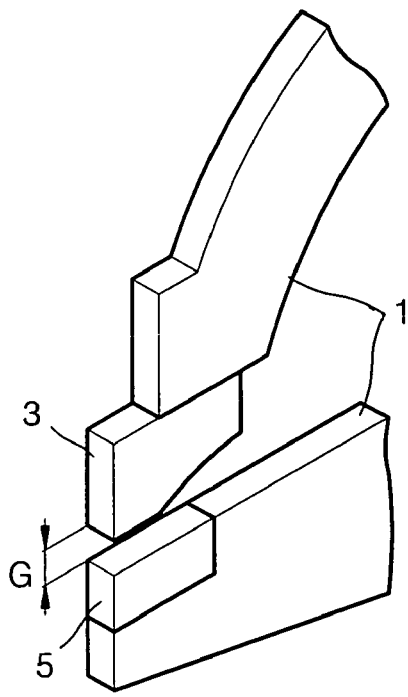
FIG. 1 is a schematic perspective view of a portion of a conventional ring type perpendicular magnetic recording head.
Figure 2:
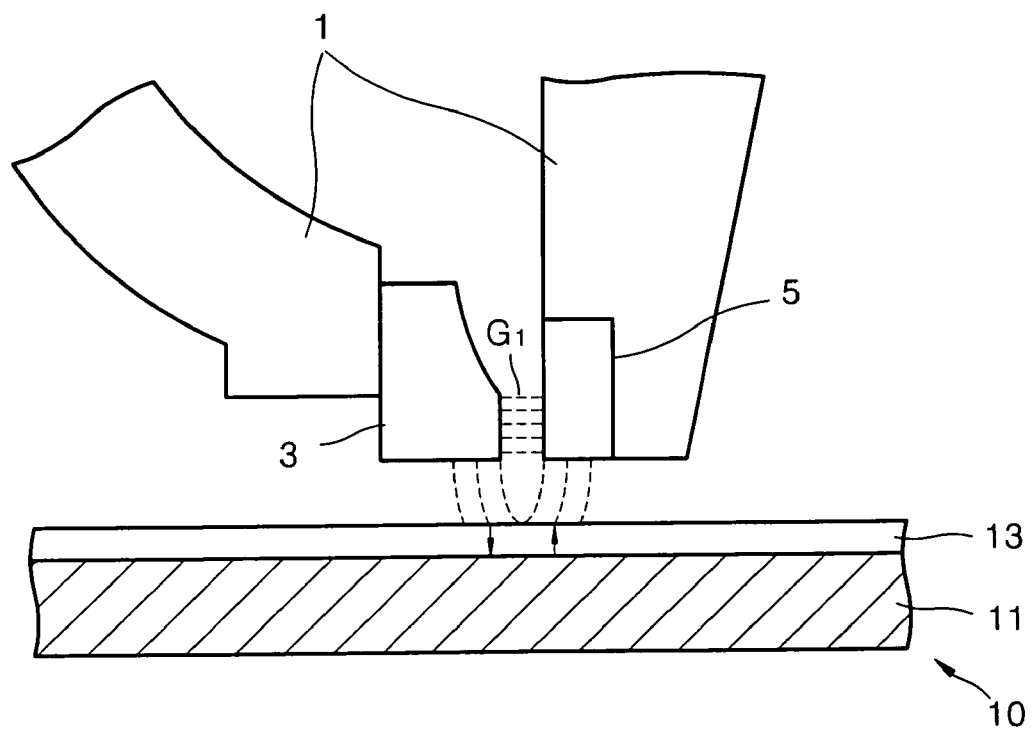
FIG. 2 is a schematic cross-sectional view of the portion of the conventional ring type perpendicular magnetic recording head of FIG. 1 and a portion of an information storage medium.
Figure 3:
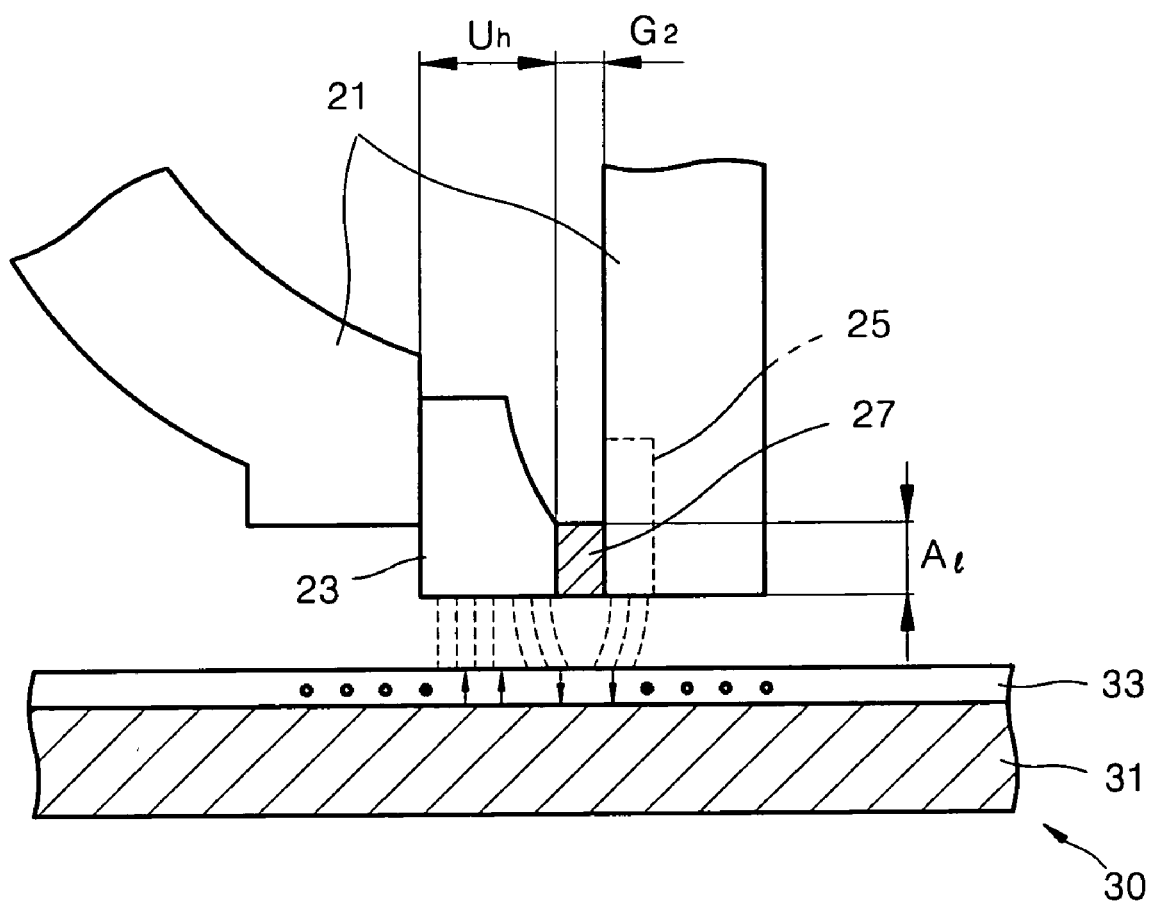
FIG. 3 is a schematic cross-sectional view of a magnetic recording head according to an embodiment of the present invention.

Referring to FIG. 3, a magnetic recording head according to an embodiment of the present invention is used to record information on and/or reproduce information from an information storage medium 30 and includes a head body 21, first and second poles 23 and 25 which face each other with a predetermined gap $G_2$ therebetween, and an anisotropic medium 27 interposed between the first and second poles 23 and 25. Here, the information storage medium 30 includes a substrate 31 and a magnetic recording layer 33 which is stacked on the substrate 31 and on which recording is performed in a predetermined magnetic recording direction.

An end of the head body 21 is divided into two parts which face each other with a predetermined gap therebetween. The first and second poles 23 and 25 are disposed on the two parts of the head body 21 to face each other. The first and second poles 23 and 25 form a magnetic path through which a magnetic field is induced by current flowing in a coil (45 of FIGS. 4B through 4C).

In order to increase an effective magnetic field, the anisotropic medium 27 is located in the predetermined gap $G_2$, reduces leakage magnetic flux into the predetermined gap $G_2$, and induces a magnetic field generated from the first pole 23 in a recording magnetization direction of the information storage medium 30. For this, the anisotropic medium 27 has a magnetic anisotropy in a predetermined direction.

Here, it is preferable that the anisotropic medium 27 is disposed to have the magnetic anisotropy in a magnetic recording direction of the magnetic recording head, i.e., in a perpendicular magnetic recording direction of the magnetic recording layer 33. As shown in FIG. 3, the anisotroptic medium 27 is disposed to have the magnetic anisotropy in a perpendicular direction to the magnetic recording layer 33 in a perpendicular magnetic recording structure.

Alternatively, the anisotropic medium 27 may be disposed to have a magnetic anisotropy in a tracking direction of the information storage medium 30.

Here, it is preferable that the anisotropic medium 27 is made of a magnetic substance having a magnetic permeability of 100 or more, preferably a magnetic permeability of about 2000 or more. In other words, it is preferable that the anisotropic medium 27 is formed of Permalloy (an alloy of Ni and Fe) or CoNiFe.

It is preferable that the size of the anisotropic medium 27 is determined so as to minimize leakage of the magnetic flux using Equation 1:

$$1 \leq \frac{U_h}{A_l} \leq 4 \quad (1)$$

wherein $U_h$ denotes a longitudinal size of a portion of the first pole 23 facing the information storage medium 30 and $A_l$ denotes a length of the anisotropic medium 27 perpendicular to the magnetic recording layer 33.

A method of manufacturing the magnetic recording head having the above-described structure will now be explained with reference to FIGS. 4A through 4D.

Figure 4A:
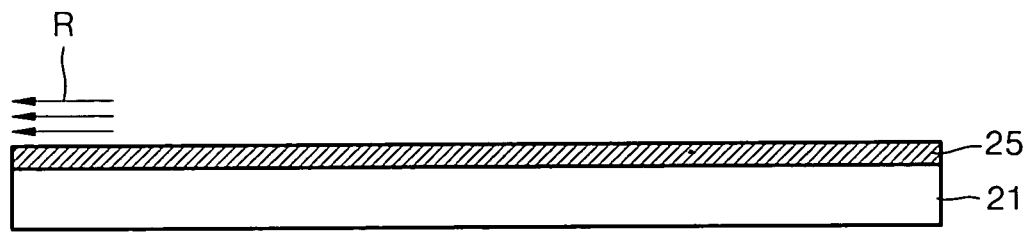
FIGS. 4A through 4D are schematic cross-sectional views illustrating a method of manufacturing the magnetic recording head shown in FIG. 3.

Referring to FIG. 4A, a portion of the head body 21 is prepared and then the second pole 25 is formed on the portion of the head body 21. Here, an upper surface of the second pole 25 is rolled in direction R indicated by arrows to determine an anisotropic direction of the anisotropic medium 27.

Figure 4B:
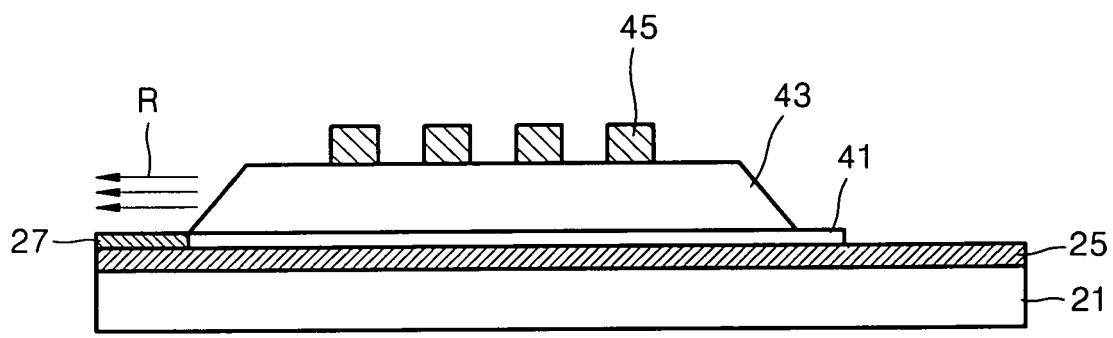

As shown in FIG. 4B, the anisotropic medium 27 is located on an end portion of the upper surface of the second pole 25 and then rolled in direction R. Here, photoresist insulators 41 and 43 are formed on a portion of the upper surface of the second pole 25 in the rear of the anisotropic medium 27, a coil 45 is prepared on the insulator 43, and the second pole 25 is electrically insulated from the coil 45.

Figure 4C:
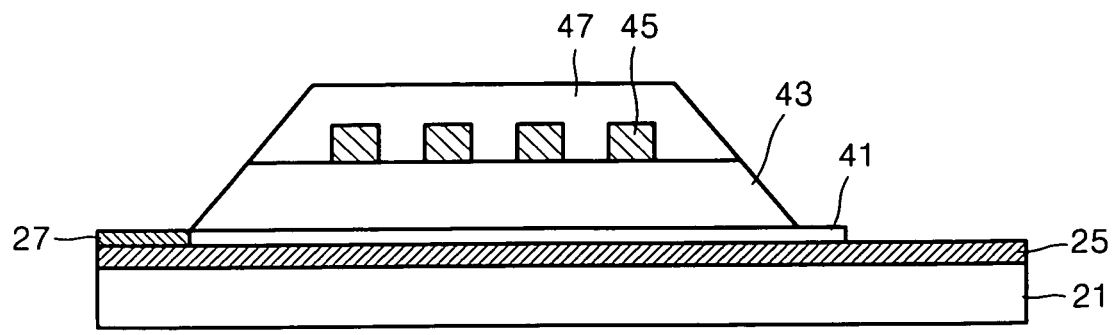
Figure 4D:
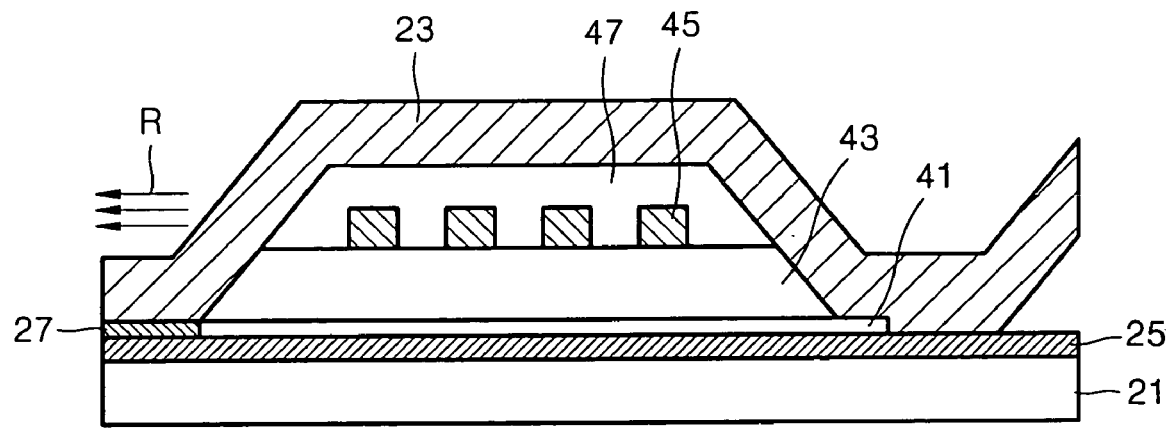

As can be seen in FIG. 4C, the coil 45 is additionally coated with a photoresist insulator 47. Next, as shown in FIG. 4D, the first pole 23 is formed on the anisotropic medium 27 and the photoresist insulators 41, 43, and 47. Thereafter, an upper surface of the first pole 23 is rolled in direction R to be made anisotropic, and then the manufacturing process ends.

The operation of the magnetic recording head manufactured according to the above-described method will be described below.

When magnetic recording is performed on the information storage medium 30, magnetic flux moves from the first pole 23 toward the second pole 25. Here, one of magnetic fields formed by the first and second poles 23 and 25 leaks into the gap $G_2$. Due to this, by inserting the anisotropic medium 27 into the gap $G_2$, a large amount of magnetic flux that normally goes from the first pole 25 into the gap $G_2$ proceeds toward the information storage medium 30 and into the second pole 25. As a result, high-density recording characteristics can be secured.

Figure 5:
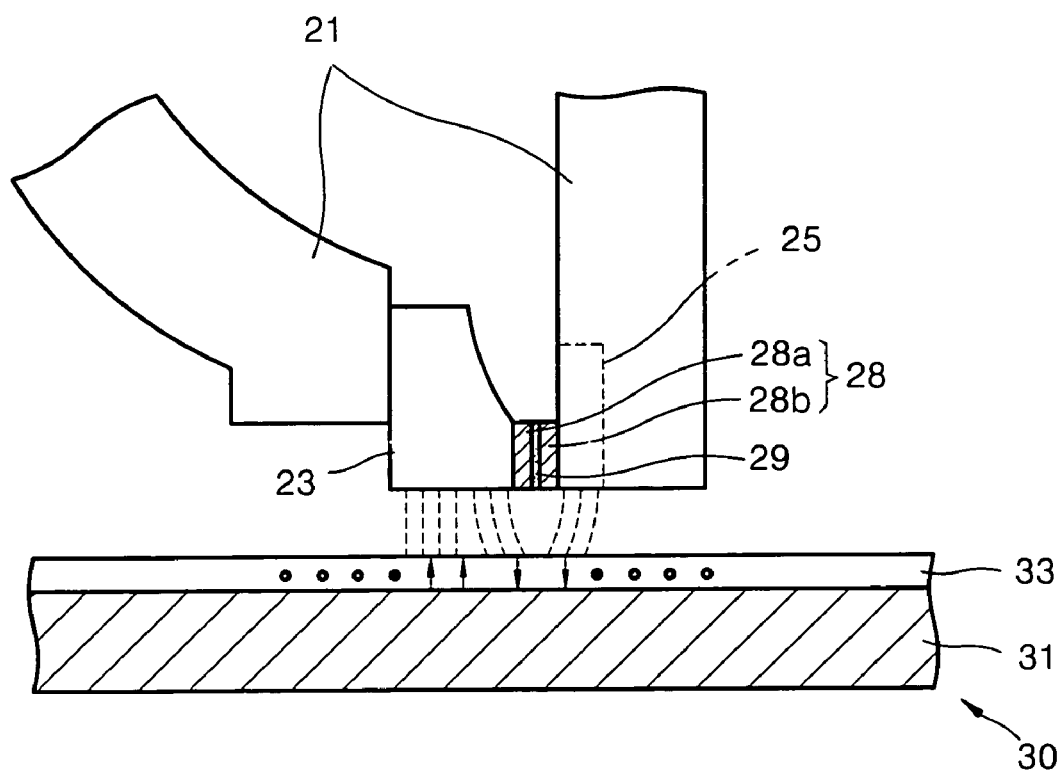
FIG. 5 is a schematic cross-sectional view of a magnetic recording head according to another embodiment of the present invention.

Referring to FIG. 5, a magnetic recording head according to another embodiment of the present invention includes a head body 21, and first and second poles 23 and 25 which face each other with a predetermined gap therebetween, an anisotropic medium 28 interposed between the first and second poles 23 and 25, and an insulating medium 29. Here, the head body 21, and the first and second poles 23 and 25 are the same as described in the previous embodiment, and thus will not be described again.

In the magnetic recording medium according to the present embodiment, the anisotropic medium 28 is divided into two parts 28a and 28b which are spaced apart from each other and the insulating medium 29 is interposed between the two parts 28a and 28b.

It is preferable that the insulating medium 29 is formed of a photoresist insulator, i.e., tantalum (Ta), titanium (Ti), aluminium oxide ($Al_2O_3$), or silicon dioxide ($SiO_2$). Accordingly, magnetic flux going into the gap $G_2$ can be efficiently reduced by the insulating medium 29.

In the magnetic recording head according to the present invention, the first pole 23 and/or the second pole 25 that has been described with reference to FIGS. 3 and 5 may be made of a magnetic anisotropic material like the anisotropic media 27 and 28. Thereafter, an anisotropic direction of the magnetic anisotropic material can be set to be identical to that of the anisotropic media 27 and 28 to efficiently induce and adjust magnetic flux.

Perpendicular and longitudinal magnetic fluxes according to the present invention will be compared with perpendicular and longitudinal magnetic fluxes according to the prior art through an electromagnetic field analysis.

Figure 6:
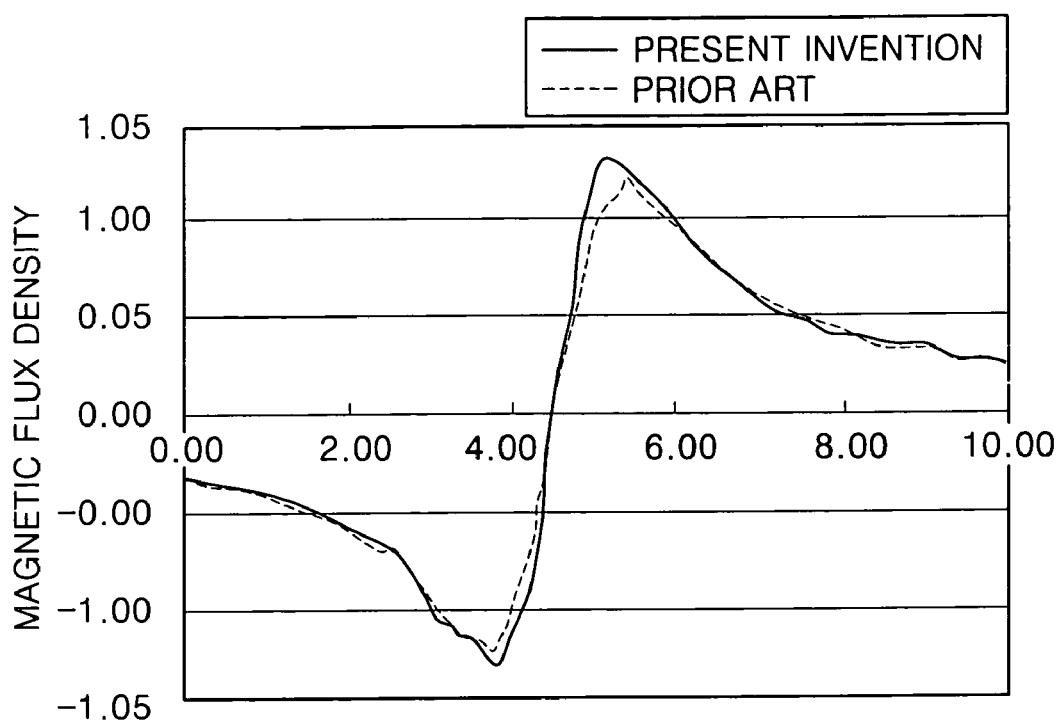
FIG. 6 is a graph for comparing a perpendicular magnetic flux density according to the present invention with a conventional perpendicular magnetic flux density.

FIG. 6 is a graph comparing a perpendicular magnetic flux according to the present invention with a conventional perpendicular magnetic flux through an electromagnetic field analysis.

A solid line represents a perpendicular magnetic flux of a magnetic recording head according to the present invention in which an anisotropic medium is inserted into the gap $G_2$, and a dotted line represents a perpendicular magnetic flux of a conventional magnetic recording head. The anisotropic medium has a magnetic permeability of 4000 and is made anisotropic in a magnetic recording direction, and a magnetic flux density indicates a value obtained in a position 50 nm away from the magnetic recording head.

As can be seen in the line graphs of FIG. 6, the magnetic flux density according to the present invention is greater than the magnetic flux density according to the prior art, and the magnetic flux density according to the present invention saturates toward a gap between the first and second poles. As a result, a magnetic field recorded on an information storage medium and recording density increased, which results in high-density recording.

Figure 7:
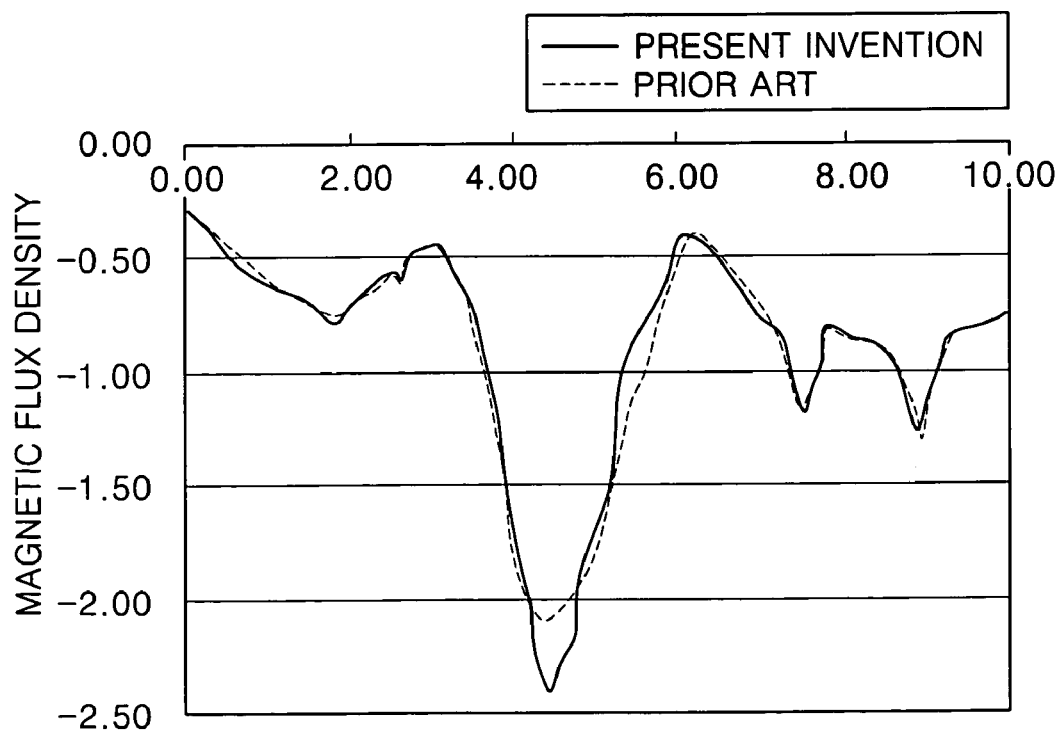
FIG. 7 is a graph comparing a longitudinal magnetic flux density according to the present invention with a conventional longitudinal magnetic flux density.

FIG. 7 is a graph comparing a longitudinal magnetic flux according to the present invention with a conventional longitudinal magnetic flux through an electromagnetic field analysis. As described with reference to FIG. 6, a solid line indicates the longitudinal magnetic flux according to the present invention and a dotted line indicates the conventional longitudinal magnetic flux.

As can be seen in FIG. 7, the longitudinal magnetic flux according to the present invention is greater than the conventional longitudinal magnetic flux. In other words, the use of an anisotropic medium increases a magnetic field in a recording magnetization direction.

As described above, a magnetic recording head according to the present invention can include an anisotropic medium inserted in a gap thereof and having a predetermined anisotropy in a direction of the gap. Thus, a magnetic field can be maximized in a recording direction. Accordingly, a high perpendicular magnetic field can be induced on an information storage medium and a recording field can be induced in a perpendicular direction. As a result, high-density recording characteristics can be secured.

While the present invention has been particularly shown and described with reference to exemplary embodiments thereof, it will be understood by those of ordinary-skill in the art that various changes in form and details may be made therein without departing from the spirit and scope of the present invention as defined by the following claims.

What is claimed is:

1. A magnetic recording head for recording information on and/or reproducing information from an information storage medium comprising a substrate and a magnetic recording layer which is stacked on the substrate and on which recording is performed in a predetermined magnetic recording direction, the magnetic recording head comprising:
 a head body having an end divided into two parts, the two parts facing each other with a predetermined distance therebetween;
 first and second poles that are disposed on the two parts of the head body, respectively, to form a magnetic path and that face each other with a predetermined gap therebetween; and
 an anisotropic medium that is interposed between the first and second poles and has a magnetic anisotropy,
 wherein a magnetic field going into the predetermined gap decreases so as to be induced in the predetermined magnetic recording direction, and wherein when a longitudinal size of a portion of the first pole facing the information storage medium is $U_h$ and a length of the anisotropic medium perpendicular to the magnetic recording layer is $A_l$, the size of the anisotropic medium is determined using Equation below:

$$1 \leq \frac{U_h}{A_l} \leq 4.$$

2. The magnetic recording head of claim 1, wherein the anisotropic medium is a magnetic substance having a magnetic permeability of 100 or more.

3. The magnetic recording head of claim 2, wherein the anisotropic medium is made of NiFe or CoNiFe.

4. The magnetic recording medium of claim 1, wherein the anisotropic medium is divided into two parts that face each other with a predetermined gap therebetween and comprises an insulating medium that is located in the predetermined gap.

5. The magnetic recording head of claim 4, wherein the insulating medium is made of one selected from a group of photoresist insulators consisting of tantalum (Ta), titanium (Ti), aluminium oxide ($Al_2O_3$), and silicon dioxide ($SiO_2$).

6. The magnetic recording head of claim 1, wherein the first pole and/or the second pole is made of a magnetic anisotropic material.

7. The magnetic recording head of claim 1, wherein the anisotropic medium is disposed so as to have a magnetic anisotropy in the magnetic recording direction of the magnetic recording head.

8. The magnetic recording head of claim 7, wherein the anisotropic medium is a magnetic substance having a magnetic permeability of 100 or more.

9. The magnetic recording head of claim 8, wherein the anisotropic medium is made of NiFe or CoNiFe.

10. The magnetic recording head of claim 7, wherein the anisotropic medium is divided into two parts that face each other with a predetermined gap therebetween and comprises an insulating medium that is located in the predetermined gap.

11. The magnetic recording head of claim 10, wherein the insulating medium is made of one selected from a group of photoresist insulators consisting of tantalum (Ta), titanium (Ti), aluminium oxide ($Al_2O_3$), and silicon dioxide ($SiO_2$).

12. The magnetic recording head of claim 7, wherein the first pole and/or the second pole is made of a magnetic an isotropic material.

13. The magnetic recording head of claim 1, wherein the anisotropic medium is disposed so as to have a magnetic anisotropy in a tracking direction of the information storage medium.

14. The magnetic recording head of claim 13, wherein the anisotropic medium is a magnetic substance having a magnetic permeability of 100 or more.

15. The magnetic recording head of claim 14, wherein the anisotropic medium is made of NiFe or CoNiFe.

16. The magnetic recording head of claim 13, wherein the anisotropic medium is divided into two parts that face each other with a predetermined gap therebetween and comprises an insulating medium that is located in the predetermined gap.

17. The magnetic recording head of claim 16, wherein the insulating medium is made of one selected from a group of photoresist insulators consisting of tantalum (Ta), titanium (Ti), aluminium oxide ($Al_2O_3$), and silicon dioxide ($SiO_2$).

18. The magnetic recording head of claim 13, wherein the first pole and/or the second pole is made of a magnetic anisotropic material.

19. A magnetic recording head for recording information on and/or reproducing information from an information storage medium comprising a substrate and a magnetic recording layer which is stacked on the substrate and on which recording is performed in a predetermined magnetic recording direction, the magnetic recording head comprising:
  a head body having an end divided into two parts, the two parts facing each other with a predetermined distance therebetween;
  first and second poles that are disposed on the two parts of the head body, respectively, to form a magnetic path and that face each other with a predetermined gap therebetween; and
  an anisotropic medium that is interposed between the first and second poles and has a magnetic anisotropy, wherein solid material is interposed between the first and second poles, and wherein the solid material consists of the anisotropic medium, wherein when a longitudinal size of a portion of the first pole facing the information storage medium is $U_h$ and a length of the anisotropic medium perpendicular to the magnetic recording layer is $A_l$, the size of the anisotropic medium is determined using Equation below:

$$1 \leq \frac{U_h}{A_l} \leq 4.$$

* * * * *